US012093332B2

(12) United States Patent
Barkan et al.

(10) Patent No.: US 12,093,332 B2
(45) Date of Patent: Sep. 17, 2024

(54) ANCHOR-BASED COLLABORATIVE FILTERING

(71) Applicant: Microsoft Technology Licensing, LLC, Redmond, WA (US)

(72) Inventors: Oren Barkan, Rishon Lezion (IL); Roy Hirsch, Tel Aviv (IL); Ori Katz, Tel-Aviv (IL); Avi Caciularu, Tel Aviv (IL); Noam Koenigstein, Tel-Aviv (IL); Nir Nice, Salit (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/452,852

(22) Filed: Oct. 29, 2021

(65) Prior Publication Data

US 2023/0138579 A1      May 4, 2023

(51) Int. Cl.
*G06F 16/9536*     (2019.01)
*G06F 11/34*       (2006.01)
(Continued)

(52) U.S. Cl.
CPC ...... *G06F 16/9536* (2019.01); *G06F 11/3438* (2013.01); *G06F 16/951* (2019.01); *G06F 16/9535* (2019.01); *G06F 16/9537* (2019.01)

(58) Field of Classification Search
None
See application file for complete search history.

(56) References Cited

U.S. PATENT DOCUMENTS

| 7,383,984 B2 | 6/2008 | Silverbrook et al. |
| 8,560,528 B2 | 10/2013 | Bachrach et al. |

(Continued)

FOREIGN PATENT DOCUMENTS

CN          107122411 B      8/2020

OTHER PUBLICATIONS

Abdollahi, et al., "Explainable Matrix Factorization for Collaborative Filtering", In Proceedings of the 25th International Conference Companion on World Wide Web, Apr. 11, 2016, pp. 5-6.
(Continued)

*Primary Examiner* — Kris E Mackes
*Assistant Examiner* — Soheila (Gina) Davanlou
(74) *Attorney, Agent, or Firm* — Holzer Patel Drennan (57) ABSTRACT

An anchor-based collaborative filtering system receives a training dataset including user-item interactions each identifying a user and an item that the user has positively interacted with. The system defines a vector space and distributes the items of the training dataset within the vector based on a determined similarity of the items. The system further defines a set of taste anchors that are each associated in memory with a subgroup of the items in a same neighborhood of the vector space. To make a recommendation to an individual user, the system identifies an anchor-based representation for the individual user that includes a subset of the defined taste anchors that best represents the types of items that the user has favorably interacted with in the past. The taste anchors included in the identified anchor-based representation for the individual user are used to make recommendations to the user in the future.

17 Claims, 8 Drawing Sheets

(51) Int. Cl.
*G06F 16/951* (2019.01)
*G06F 16/9535* (2019.01)
*G06F 16/9537* (2019.01)

(56) References Cited

U.S. PATENT DOCUMENTS

| | | | |
|---|---|---|---|
| 9,015,236 B1 * | 4/2015 | Fredinburg | G06F 16/9535 709/203 |
| 9,348,924 B2 | 5/2016 | Somekh et al. | |
| 9,710,843 B2 | 7/2017 | Levy et al. | |
| 9,858,318 B2 | 1/2018 | Rajaram et al. | |
| 10,592,555 B1 * | 3/2020 | Zhang | G06F 40/284 |
| 10,783,169 B1 * | 9/2020 | Miskovic | G06F 16/29 |
| 11,100,558 B1 * | 8/2021 | Chanda | H04L 67/535 |
| 2019/0163710 A1 * | 5/2019 | Haghighat Kashani | G06F 16/24578 |
| 2020/0201727 A1 * | 6/2020 | Nie | G06N 20/00 |
| 2021/0182956 A1 * | 6/2021 | Rao | G06Q 40/02 |
| 2022/0044137 A1 * | 2/2022 | Liu | G06Q 30/02 |
| 2022/0245047 A1 * | 8/2022 | You | G06F 16/906 |

OTHER PUBLICATIONS

Abdollahi, et al., "Transparency in Fair Machine Learning: The Case of Explainable Recommender Systems", In The Book of Human and Machine Learning, Jun. 8, 2018, 15 pages.

Barkan, et al., "Explainable Recommendations via Attentive Multi-Persona Collaborative Filtering", In Proceedings of the 14th ACM Conference on Recommender Systems, Sep. 26, 2020, pp. 468-473.

Dror, et al., "The Yahoo! Music Dataset and KDD-Cup'11", In Proceedings of Machine Learning Research, Jun. 2012, pp. 3-18.

Duchi, et al., "Adaptive Subgradient Methods for Online Learning and Stochastic Optimization", In The Journal of Machine Learning Research, vol. 12, Issue 7, Jul. 2011, pp. 2121-2159.

Harper, et al., "The MovieLens Datasets: History and Context", In The Journal of ACM Transactions on Interactive Intelligent Systems, vol. 5, Issue 4, Dec. 22, 2015, 19 Pages.

He, et al., "Neural Collaborative Filtering", In Proceedings of the 26th International Conference on World Wide Web, Apr. 3, 2017, pp. 173-182.

He, et al., "Ups and Downs: Modeling the Visual Evolution of Fashion Trends with One-Class Collaborative Filtering", In Proceedings of the 25th International Conference on World Wide Web, Apr. 11, 2016, pp. 507-517.

Kingma, et al., "Adam: A Method for Stochastic Optimization", In Repository of arXiv:1412.6980v1, Dec. 22, 2014, pp. 1-9.

Koren, et al., "Matrix Factorization Techniques for Recommender Systems", In The Journal of Computer, vol. 42, Issue 8, Aug. 7, 2009, pp. 30-37.

Kunaver, et al., "Diversity in Recommender Systems—A survey", In The Journal of Knowledge-Based Systems, vol. 123, May 1, 2017, pp. 154-162.

Liang, et al., "Variational Autoencoders for Collaborative Filtering", In Proceedings of the World Wide Web Conference, Apr. 23, 2018, pp. 689-698.

Maaten, et al., "Visualizing Data using t-SNE", In The Journal of Machine Learning Research, vol. 9, Nov. 1, 2008, pp. 2579-2605.

Noia, et al., "An Analysis of Users' Propensity Toward Diversity in Recommendations", In Proceedings of the 8th ACM Conference on Recommender systems, Oct. 6, 2014, pp. 285-288.

Qin, et al., "Sequential Recommendation with Dual Side Neighbor-Based Collaborative Relation Modeling", In Proceedings of the 13th International Conference on Web Search and Data Mining, Feb. 3, 2020, pp. 465-473.

Rendle, et al., "BPR: Bayesian Personalized Ranking from Implicit Feedback", In Repository of arXiv preprint arXiv:1205.2618, May 9, 2012, pp. 452-461.

Ricci, et al., "Introduction to Recommender Systems Handbook", In Publication of Springer, Oct. 5, 2010, pp. 1-35.

Wang, et al., "Neural Graph Collaborative Filtering", In Proceedings of the 42nd international ACM SIGIR Conference on Research and Development in Information Retrieval, Jul. 21, 2019, pp. 165-174.

Weston, et al., "Nonlinear Latent Factorization by Embedding Multiple user Interests", In Proceedings of the 7th ACM Conference on Recommender Systems, Oct. 12, 2013, pp. 65-68.

Zamani, et al., "Learning a Joint Search and Recommendation Model from User-Item Interactions", In Proceedings of the 13th International Conference on Web Search and Data Mining, Feb. 3, 2020, pp. 717-725.

Zhang, et al., "Graphs Regularized Robust Matrix Factorization and Its Application on Student Grade Prediction", In The Journal of Applied Sciences, vol. 10, Issue 5, Mar. 4, 2020, pp. 1-19.

Zhang, et al., "Learning User Representations with Hypercuboids for Recommender Systems", In Proceedings of the 14th ACM International Conference on Web Search and Data Mining, Mar. 8, 2021, pp. 716-724.

Zhang, et al., "Neural Binary Representation Learning for Large-Scale Collaborative Filtering", In The Journal of IEEE Access, vol. 7, May 7, 2019, pp. 60752-60763.

Zhang, et al., "STAR-GCN: Stacked and Reconstructed Graph Convolutional Networks for Recommender Systems", In Repository of arXiv:1905.13129v1, May 27, 2019, 7 Pages.

Zhao, et al., "Improving the Estimation of Tail Ratings in Recommender System with Multi-Latent Representations", In Proceedings of the 13th International Conference on Web Search and Data Mining, Feb. 3, 2020, pp. 762-770.

Barkan, et al., "Anchor-based Collaborative Filtering", In Proceedings of the 30th ACM International Conference on Information & Knowledge Management, Oct. 30, 2021, pp. 2877-2881.

Khawar, et al., "Modeling Multidimensional User Preferences for Collaborative Filtering", In Proceedings of IEEE 35th International Conference on Data Engineering (ICDE), Apr. 8, 2019, pp. 1618-1621.

"International Search Report and Written Opinion Issued in PCT Application No. PCT/US22/043398", Mailed Date: Dec. 6, 2022, 14 Pages.

Wu, et al., "Integrating the Anchoring Process with Preference Stability for Interactive Movie Recommendations", In Repository of International Conference on Human Interface and the Management of Information, Jul. 21, 2013, pp. 639-648.

* cited by examiner

ANCHOR-BASED COLLABORATIVE FILTERING

BACKGROUND

Collaborative filtering (CF) is a method of making automatic predictions (filtering) about the interests of a user by collecting preferences or taste information from many users (collaborating). These systems typically represent each user and item by a single vector and user-item interactions are modeled by learning some function over the corresponding vectors that predicts the likeness of item vectors to individual user vectors.

Because traditional CF recommendation systems attempt to learn the user based on a closed set of the user's past item choices, the diversity of recommendations in these systems is limited and tends to reflect the assumption that a user wants to interact with the types of items that he or she interacts with the most. This is not always the case. If, for instance, a user watches comedy films eighty percent of the time and French foreign language films five percent of the time, a traditional CF algorithm is likely to recommend comedy films most all of the time and may not ever recommend a French foreign language film because the user watches them so infrequently. In this case, the recommendation algorithm does not adequately reflect the breadth of a different tastes that a user may enjoy.

SUMMARY

According to one implementation, a recommendation system includes a taste model trained on user-item interactions that each identify a user and an item that the user has positively interacted with. The recommendation system defines a vector space and distributes items of the training dataset within the vector space based on a determined similarity of the items to one another. The recommendation system further defines a set of taste anchors that are each associated in memory with a subgroup of the items in a same neighborhood of the vector space. To render a recommendation to a user, the recommendation system determines a similarity between past user-item interactions of the user and the subgroup of items associated with each of the taste anchors. The recommendation system identifies a set of taste anchors that best represent the user, and recommends items associated those taste anchors to the user in the future.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

Traditional collaborative filtering algorithms learn users as individual vectors and make recommendations by applying learned functions to those individual user vectors. Collaborative filtering techniques disclosed herein introduce the concept of "anchor-based filtering," which is based on the assumption that each user can be represented by a collection of different tastes that are shared across the body of users. For example, one user may have tastes (preferences) that favor utopian science fiction films, historical action films, and musicals, while another user may enjoy quickly independent films and romantic dramas.

The following disclosure provides a CF-type recommendation system that models a collection of tastes, referred to herein as "taste anchors" (e.g., vectors) that are shared between various users, where any individual user may be described by a combination of those taste anchors. In one implementation, each taste anchor is defined in association with a collection of items (e.g., movies, songs) that are collectively determined to satisfy defined similarity criteria. Each user can be described by an anchor-based user presentation that is a subset of the defined taste anchor. This anchor-based user presentation may be understood as a "taste palate" that is, for example, identified based on the user's personal interactions with items and associations between those items and the taste anchors defined within the modeling solution. Recommendations for a user are selected from the various tastes included in the user taste palate identified for an individual user. For example, a user that watches 80% comedy, 10% horror films, and 10% French foreign language films may be assigned a user taste palate that incorporates defined three tastes associated with comedy, horror, and French films, respectively. Based on this, the recommendation system may make recommendation items associated with these three tastes.

The anchor-based collaborative filtering techniques disclosed herein may be applicable in a wide range of recommendation systems that recommend various types of items for user interaction or consumption. Although the examples disclosed herein largely pertain to entertainment media (e.g., movies, songs, television shows), these examples are intended to be non-limiting.

Figure 1:
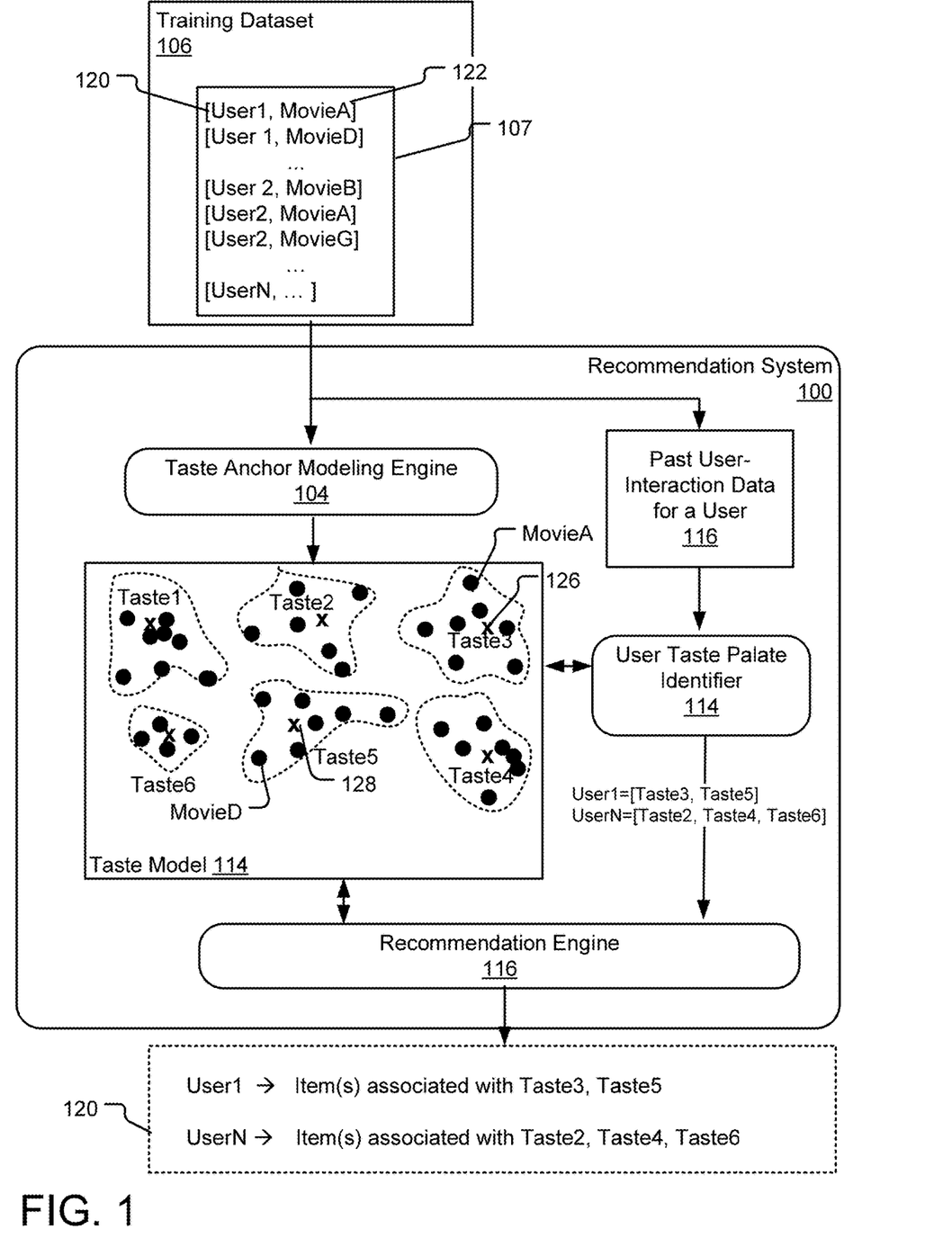
FIG. 1 illustrates an example recommendation system that utilizes an anchor-based collaborative filtering technique to recommend items to users based on one or more identified tastes of the user.

FIG. 1 illustrates an example recommendation system 100 that utilizes an anchor-based collaborative filtering technique to recommend items to users based on one or more identified "tastes" of the user. Items may take on a variety of forms in different implementations and may include, without limitation, movies, TV shows, songs, artists, products for purchase, books, etc.

In contrast to traditional CF modeling solutions that learn a different user vector for each individual user, the recommendation system 100 learns a set of taste anchors (e.g., representing different user tastes), which may be understood as a set of vectors that are shared across all users in a user set. The recommendation system 100 identifies, for each user, a subset of the taste anchors that best correlate with the user's individual taste and uses that identified subset of the taste anchors as a basis for making recommendations to the user.

The recommendation system 100 includes a taste anchor modeling engine 104 that receives, as input, a training dataset 106 that is used to train a taste model 114. In different implementations, the training dataset 102 may include different types of data. By example and without limitation, the training dataset 102 of FIG. 1 includes user-item interaction pairs 107 that each identify a user (e.g., via a user ID 120) and an item (e.g., an item 122) that the user has had a defined type of interaction with. In the examples provided herein, each of the user-item interaction pairs 107 represents a positive interaction that occurred between the user and the item (e.g., implicit ratings). For example, item 122 may be a movie that the user 120 rated highly, such as in excess of 3.5/5 stars or some other threshold.

The training dataset 106 includes multi-item history for many individual users and is therefore usable to determine information such as the subset of the users that have interacted with any given item (e.g., the subset of users that watched the movie "Ocean's 11") and/or a subset of the items that each individual user has interacted with. For example, the dataset may identify all movies that the user 120 has ever watched on a particular online viewing platform. Although some implementations may utilize a training dataset of mixed item types (e.g., different types of media), the items and recommendations in the example of FIG. 1 are all of a same item type (e.g., movies).

The taste anchor modeling engine 104 determines one or more similarity metrics usable to associate the individual items with different "tastes" (described below). In one implementation, the taste anchor modeling engine 104 determines a similarity metric referred to herein as a "same-user co-occurrence probability" for each for each pair of items in the training dataset 106. The "same-user co-occurrence probability" refers to a likelihood of an individual user having a positive interaction with both items of a defined pair. For example, 20% of the users that had a positive interaction with the movie "Zoolander" may have also had a positive interaction with the movie "Dumb & Dumber" while only 3% of the users that had a positive interaction with the movie "Die Hard" may have had a positive interaction with the movie "Free Willy." In this example, the same-user co-occurrence probability for the pair "Zoolander"/"Dumb & Dumber" is 20% while the same-user co-occurrence probability for the pair "Die Hard"/"Free Willy" is 3%. When the same-user co-occurrence probability is high (e.g., in excess of a set threshold) for a pair of movies, the movies may be understood as being similar and/or as good replacements for one another such that one might serve as a strong recommendation to a user that has had a positive interaction with the other.

The taste anchor modeling engine 104 determines a vector representation for each of the items in the training dataset 116 ("item vectors") that is based on the determined similarity metric(s) for each pair of the items. In one implementation, the taste anchor modeling engine 104 models parameters for each item vector that maximize a joint selection likelihood of the training dataset 116 satisfying the modeled parameters. The result of this modeling is a spatial distribution of item vectors that reflect the same-user co-occurrence probability observed in the training dataset 116. Stated differently, the item vectors are defined such that the proximity of any two item vectors in the vector space is generally representative of the same-user co-occurrence probability for those two items. The closer the two items are together within the vector space, the more likely it is that those two items will be positively interacted with (e.g., ranked highly) by the same user.

By example and without limitation, the taste model 114 of FIG. 1 illustrates a simplified spatial representation including item vectors represented as black dots. Black dots that are further apart may be understood as having a lower same-user co-occurrence probability than items represented by black dots that are closer together, meaning items further apart are less likely to positively interacted with by a same user than items closer together. For example, if a lot of users in the dataset positively interacted with both Zoolander and Dumb & Dumber, the corresponding dots in the taste model 114 appear closer together than other pairs of movies less likely to be positively interacted with by a same user.

In addition to optimizing the vector representations of the items, the taste anchor modeling engine 104 also optimizes vector parameters for a number of taste anchors. In some implementations, the parameters for the taste anchors are optimized concurrent with the parameters for the item vectors. The parameters of the taste anchors are selected to distribute the taste anchors throughout the defined vector space such that each taste anchor can be defined in association with items in a surrounding "neighborhood," where the neighborhood generally refers to a vector space surrounding the taste anchor. For example, the taste model 114 depicts taste anchors as "x's" (e.g., a taste anchor 126) and neighborhoods by dotted lines. In different implementations, the size of the various neighborhoods may be uniform or non-uniform and set to satisfy a variety of different design objections. In one implementation, each taste anchor acts as a neighborhood centroid and is associated with (e.g., has a neighborhood defined to include) all items within set radius of that taste anchor. In another implementation, neighborhood size is set to satisfy constraints imposed upon the number of items associated with each taste anchor (e.g., in each neighborhood) and/or the total number of neighborhoods that are to be defined.

Although the taste model 114 is shown as a 2D representation, this representation may be understood as a transformation on a higher dimensional vector space (e.g., with high dimensional taste anchors) that allows the taste anchors and the items to be visualized together.

The parameterization of the taste anchors governs the spatial placement of those taste anchors within the taste model 114. In one implementation, the parameterization of the taste anchors (x's) is based on an inclusiveness constraint that ensures that each anchor is positioned in the vector space within a set distance of at least one item vector, thereby ensuring taste anchors are not randomly distributed in regions of the vector space where there are no items. In another implementation, the parameterization of the taste anchors is based on an exclusiveness constraint that minimizes the number of taste anchors that any one item is associated with. For example, the taste anchor modeling engine 104 may try to minimize the number of taste anchors positioned within a defined distance of any one of the item vectors.

The result of the above parameterization of items and taste anchors within the vector space is a number of subgroups of items from the training dataset 102 that are each associated in memory with a different taste anchor. These subgroups represent different user tastes or preferences, somewhat like a flavor. Since items associated with a same taste anchor are likely to be enjoyed (positively interacted with) by the same users, these items may have implicit commonalities that give rise to these positive interactions. For example, a first taste anchor "Taste1" may be associated a subgroup of movies including a large percentage of romantic comedies while a second taste anchor "Taste2" may include a subgroup of movies including a large percentage of "thriller/sci-fi" films. Although all of the items in the taste model 114 of FIG. 1 are shown to be associated with a single taste anchor, there may exist scenarios where some items are associated with two or more taste anchors (e.g., a combination of taste anchors closest to the item in the vector space).

In one implementation, the taste model 114 is re-created (refreshed) on a regular basis, such as every few hours or days, taking in user-item interaction data for new and existing users of an online platform. A user taste palate identifier 114 uses the taste model 114, along with past user-item interaction data 116, to determine a "taste palate" for any given user represented by the training dataset 106. Like the user-item interactions in the training dataset 106, the past user-item interaction data 116 may be understood as including or consisting of positive user-item interactions. For instance, to determine the taste palate of User1 (represented in the training dataset 106), the user taste palate identifier 114 accesses the user-item interaction data 116 for user1.

In the example of a movie recommendation system, the user taste palate identifier 114 may access a full or partial list of movies that a particular user (User1) has interacted with positively in the past. The taste palate identifier 114 measures overlap between the past user-item interaction data 116 for this user and the items associated with each of the different taste anchors to identify a subset of the taste anchors that best represent the user's personal tastes (preferences). For example, User1 has positively interacted with MovieA and MovieD (as shown by the training data) in the past. Per the taste model 114, MovieA has been associated with a first taste anchor 126 and MovieD has been associated with a second taste anchor 128. The user taste palate identifier 114 determines that User1 has a taste palate that is a combination of taste anchor 126 and 128 (Taste3 and Taste5). This taste palate is also referred to herein as an "anchor-based representation" of the user. Since each taste anchor may be a high-dimensional vector, the anchor-based representation of the user (taste palate) is a combination of these high-dimensional vectors.

Although the above simplified example of a user taste palate is based on only two items that the user has interacted with, more realistic examples may include a large number of items, such as tens or hundreds of items. The anchor-based representation of the user (user taste palate) may be a combination of any subset of the defined taste anchors.

Once the anchor-based representation of an individual user has been determined as described above, a recommendation engine 116 renders recommendations 120 based on the user's determined anchor-based representation. That is, the recommendation engine 116 recommends items to the user that are associated with taste anchors included within the user's anchor-based representation. In the above example where User1 has an anchor-based representation that is a combination of taste anchors 128 and 128 (Taste3 and Taste5), the recommendation engine 116 recommends items to the user that are associated with these taste anchors in the taste model 114.

Because the recommendation system 100 renders recommendations based on taste anchors (vectors) shared across all users and items, the resulting recommendations are more diverse and representative of the many different tastes that a user may have, rather than merely the type of items that the user interacts with the most.

Figure 2:
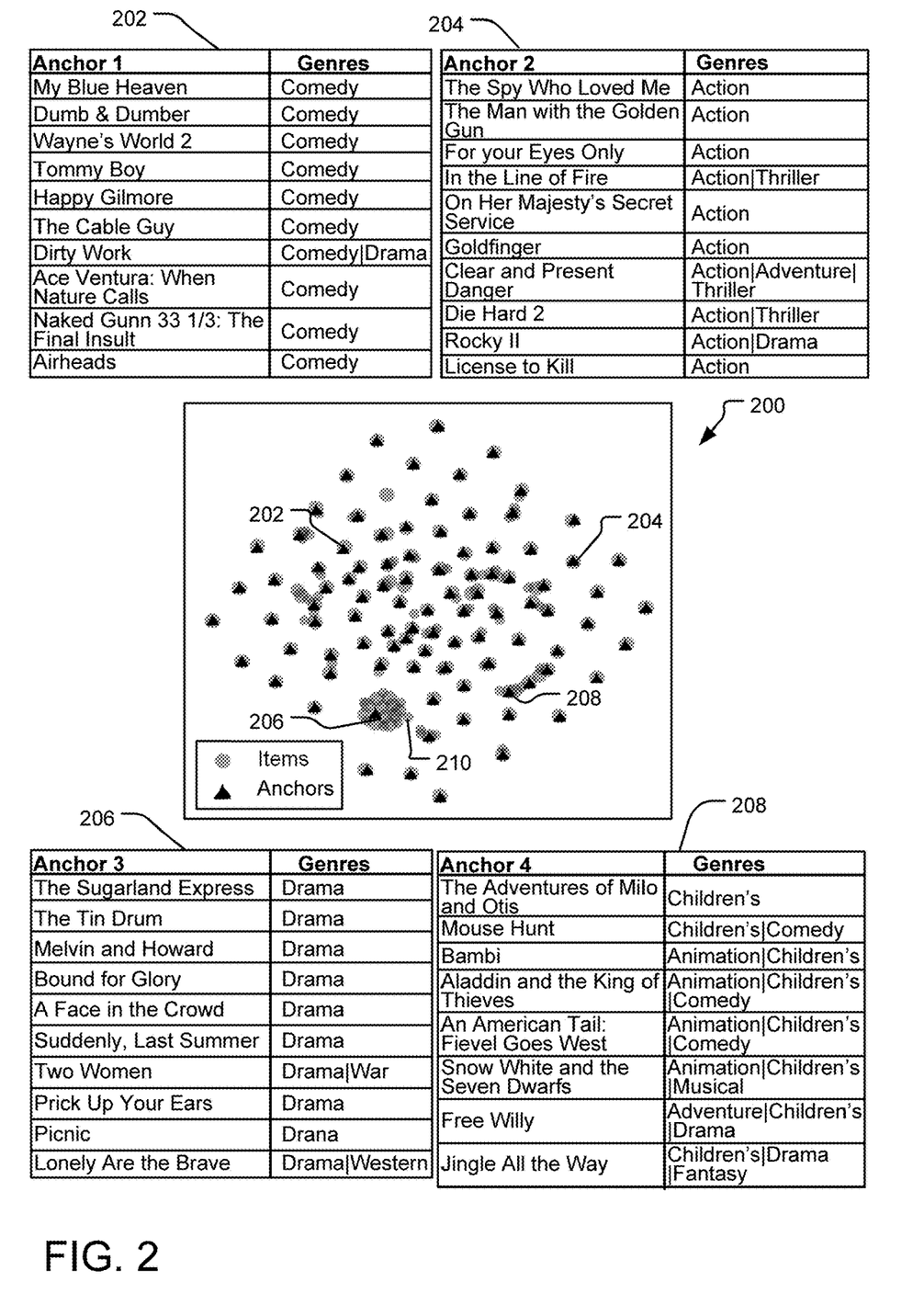
FIG. 2 illustrates an example taste model generated by an anchor-based collaborative filtering recommendation system.

FIG. 2 illustrates an example taste model 200 generated by an anchor-based collaborative filtering recommendation system. In the taste model 200, items are represented by grey dots (e.g., an item 210), many of which are overlapping or close together so they appear to have merged into clusters. Taste anchors are represented by black triangles (e.g., taste anchors 202, 204, 206, and 208). In one implementation, the taste model 200 is created via the same or similar techniques to those described above with respect to FIG. 1, which include defining items as vectors in a vector space and determining parameters for those vectors that provides for a spatial representation that corresponds to the same-user co-occurrence probability for all pairs of the items that is observed in the training dataset. Thus, the distance between all items in the taste model 200 is generally representative of the likelihood that the items are favorably interacted with by a same user. In one implementation, each one of the taste anchors is defined in association with a subgroup of the items that may be understood as having at least a threshold likelihood of being positively interacted with by a same user.

The role of the taste anchors is two-fold (1) to capture the distinct "tastes" in the learned space (clustering) and (2) to provide an anchor-based representation for each individual user and item via a convex combination over the taste anchors. Each different taste anchor is defined in association with a neighborhood region of the vector space and the items positioned within that neighborhood region.

In the example of FIG. 2, the both the item vectors (dots) and taste anchors (triangles) in the taste model 200 are initialized as a set of latent vectors. Optimization techniques are employed to parametrize both sets of vectors to best fit the data while satisfying various constraints (discussed below). In one implementation, the parameterization of the taste anchors and items is performed by optimizing a loss equation including three terms (1) a negative log-joint distribution term; (2) an inclusiveness constraint; and (3) an exclusiveness constraint, all of which are discussed below. Detailed example representations of these terms are discussed in detail in Oren Baran et al., 2021. "Anchor-Based Collaborative Filtering," in 30th ACM International Conference on Information and Knowledge Management, which is hereby incorporated by reference for at that it discloses or teaches. Optimization is carried out using a stochastic gradient descent methodology. Other implementations may utilize other known modeling techniques to fit the item vectors and taste anchors to the data observed.

In the above-described implementation, the negative log-joint distribution term ensures that learned parameters are optimized to explain the data in the training dataset. The exclusiveness constraint is employed on item-to-anchor relations to ensure that each item is represented by a small number of effective taste anchors. The motivation behind this constraint stems from the expectation that most items are homogeneous in terms of taste. For example, in the music domain, songs usually belong to a specific genre/subgenre that entails specific characteristics (e.g., heavy metal, classical, gospel, etc.) In the less common case of items that may merge multiple genres, it is still possible for an item representation to have a high affinity with multiple taste anchors.

The exclusiveness constraint may be effective to encourage a sparsity anchor-based decomposition, leading to taste anchors that capture very specific tastes. For example, the exclusiveness constraint may be a mathematical term that minimizes or otherwise limits the number of taste anchors that any individual item is associated with.

The above-described implementation further employs an inclusiveness constraint. The inclusiveness constraint encourages a uniform distribution of the items over the taste anchors, avoiding the creation of anchors that are redundant and/or not associated with any item in their vicinity. While the exclusiveness constraint encourages each item to be associated with a small number of anchors, the inclusiveness constraint ensures full coverage of the taste anchors by the items (e.g., the items are encouraged to be evenly distributed among the anchors).

Per the above-described methodology, each one of the taste anchors is defined in association with a subgroup of the items (movies) that mutually satisfy similarity criteria. By example and without limitation, FIG. 2 illustrates tables identifying items that have been associated with each of four taste anchors using the aforementioned techniques. For example, a first taste anchor 202 is associated with a group of movies that are all classified as the genre "comedy" or comedy in combination with another genre (e.g., "Dirty Work" is classified as a comedy-drama). Likewise, a second taste anchor 204 is associated with a subgroup of the movies that are all classified as action or action in combination with one or more other genres (e.g., action-thriller, action-drama, action-adventure-thriller). A third taste anchor 206 is associated with a subgroup of the movies that are all classified, at least in part, as dramas. Likewise, a fourth taste anchor 208 is associated with a subgroup of the movies that are all suitable for children due to genre classifications such as "animation" or "children's."

A recommendation system using the taste model 200 may be configured to determine an anchor-based representation for each user based on past user-item interactions of an individual user, where the anchor-based representation is given as a subset of the defined taste anchors (e.g., 202, 204, 206, 208, etc.). For example, an individual user may be represented by a combination of the first taste anchor 202 (comedies) and the third taste anchor 204 (dramas). Recommendations for each individual user are then picked from the lists of items associated with each taste anchor within the anchor-based representation determined for a specific user.

Figure 3A:
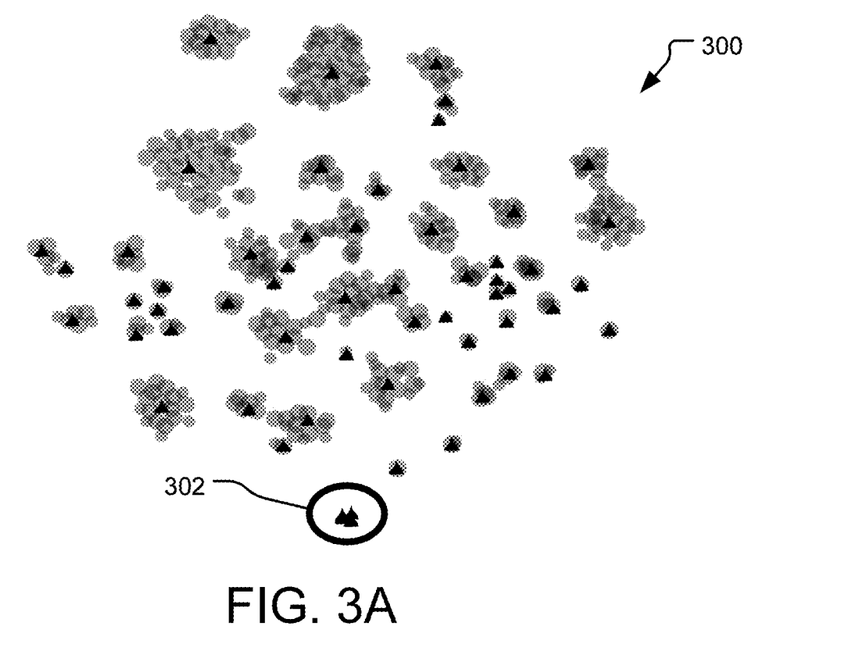
FIG. 3A illustrates a taste model with items distributed according to a first set of constraints.
Figure 3B:
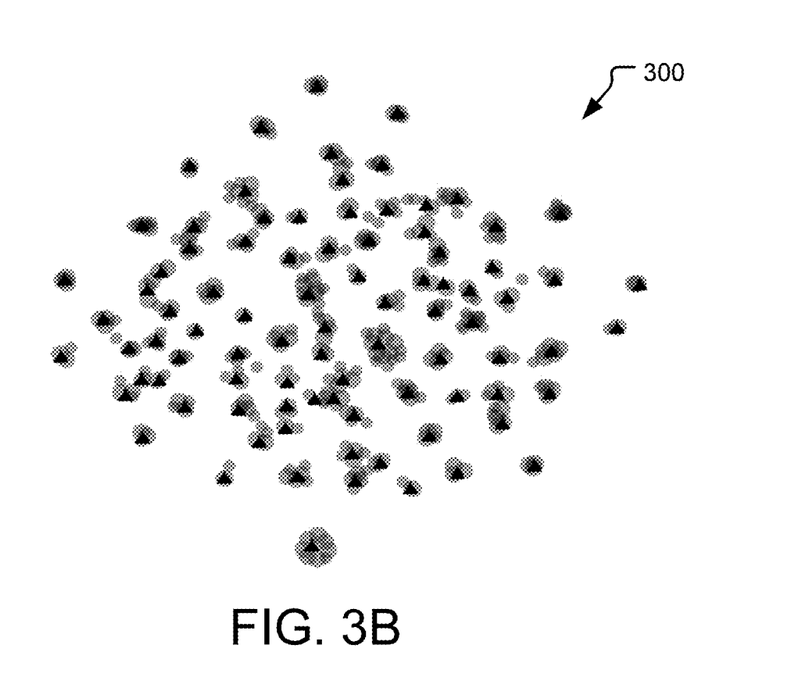
FIG. 3B illustrate the taste model of FIG. 3A with the items distributed according to a second set of constraints.
Figure 3C:
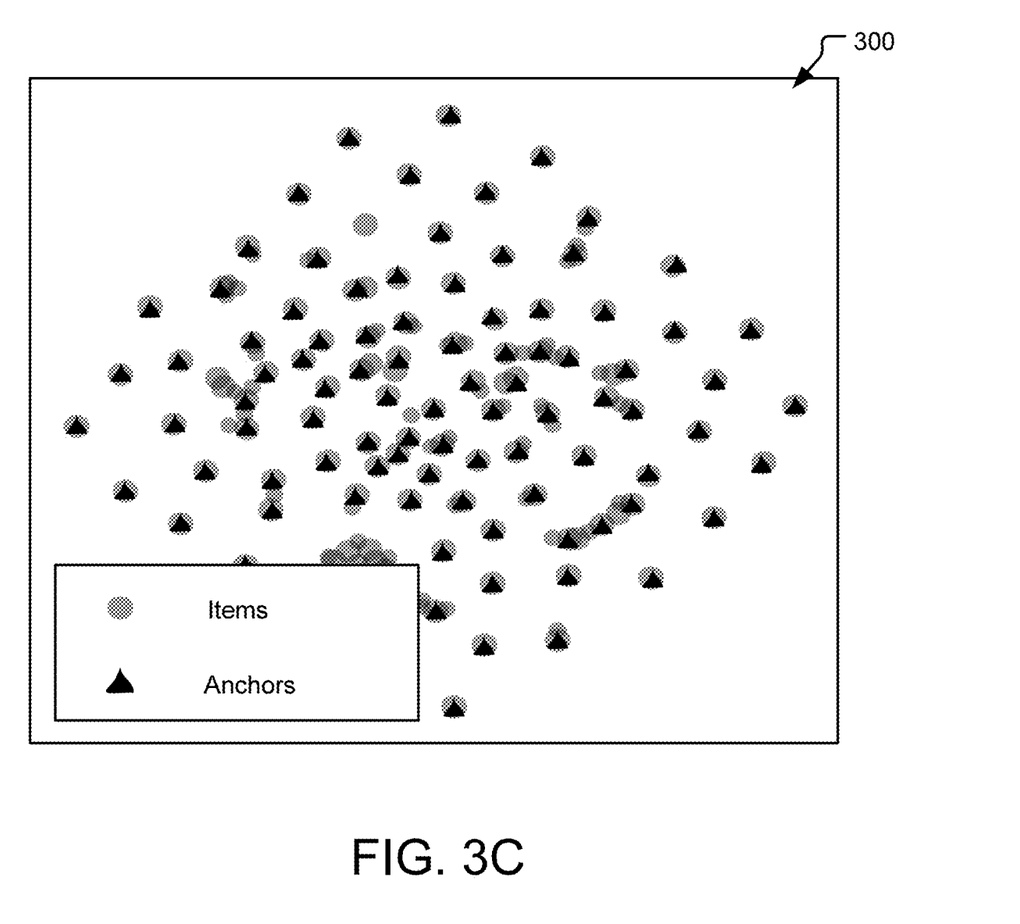
FIG. 3C illustrate the taste model of FIGS. 3A and 3B with the items distributed according to a third set of constraints.

FIG. 3A-3C illustrates an effect of varying the value of an inclusiveness constraint during parameterization of taste anchors and items in a taste model 300 consistent with the examples and description provided above. As described above with the implementation of FIG. 2, an inclusiveness constraint may be used in the optimization of parameters for the taste anchors and items to encourage a uniform distribution of the items over the taste anchors. In FIG. 3A, the inclusiveness constraint is disabled (e.g., set to 0). Here, it can be seen that items cluster tightly together and there exist several anchors 302 that are off in space, isolated without any associated items. In FIG. 3B, the inclusiveness constraint is set to a small value (e.g., 0.5). Here, it is seen that items are spread out more than in FIG. 3A, and all taste anchors appear to be associated with one or more items. Items are clustered into groups of variable sizes. In FIG. 3C, the inclusiveness constraint is set to a larger value than in FIG. 2A or 2B (e.g., 1.0). Here, a most even distribution of items and anchors is observed such that item clusters are more equal in size and taste anchors are evenly distributed among the item clusters.

Figure 4:
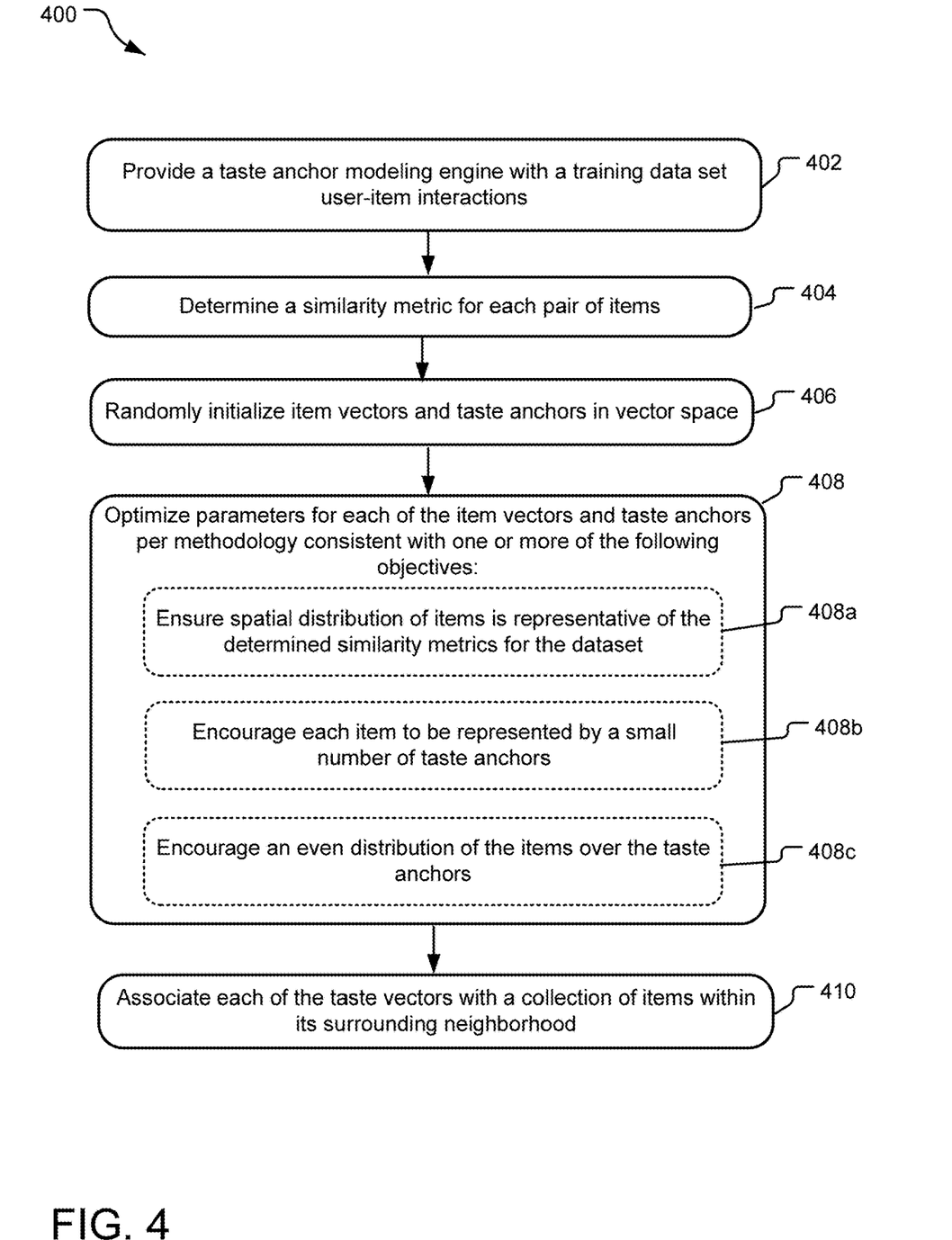
FIG. 4 illustrates example operations for generating a taste model using an anchor-based collaborative filtering technique.

FIG. 4 illustrates example operations 400 for generating a taste model using an anchor-based collaborative filtering technique. Consistent with other implementations described herein, the taste model 400 may generate a spatial representation of items that is representative of similarities between items observed within the dataset (e.g., vector separations between each pair of items may represent a determined similarity for those items). The spatial representation may include taste anchors (e.g., another vector type) associated with subgroups of items that have been identified as similar via one or more similarity metrics. When used as a basis for making recommendations in an item recommendation system, a common set of taste anchors is shared between all users that may receive system recommendations.

A training operation 402 provides a taste anchor modeling engine with a training data set including user-item interactions, each identifying a specific user and an item that the specific user positively interacted with. A determining operation 404 determines a similarity metric for each pair of items in the dataset. In one implementation, the similarity metric is a same-user co-occurrence probability, as defined elsewhere herein.

An initialization operation 406 randomly initializes item vectors and anchor vectors in a vector space. An optimization operation 408 optimizes a loss function to derive parameters for the randomly-initialized item vectors and taste anchors such that a resulting vector representation satisfies one or more of objectives 408a, 408b, 408c.

A first objective 408a ensures that a spatial distribution of the items is representative of the determined similarity metrics for the training dataset. For example, the optimization operation 408a may ensure that pairs of items identified as having a higher degree of similarity (e.g., a high same-user co-occurrence probability) have a smaller separation in the vector space than pairs of items identified as having a comparatively lower degree of similarity. A second objective 408b encourages each item to be represented by a small number of taste anchors (e.g., the number of items assigned to each taste anchor is minimized). A third objective 408c encourages an even distribution of the items over the taste anchors. In one implementation, the first objective 408a, second objective 408b, and third objective 408c are represented as different terms in the loss function that is optimized per the optimization operation 408. In some implementations, the optimization operation 408 may enforce constraints to achieve fewer than three the objectives 408a, 408b, and 408c and/or may be designed to effect other objectives in addition to or in lieu 408a, 408b, or 408c.

An association operation 810 associates each of the taste anchors with a collection of the item vectors in positioned within a neighborhood of the taste anchor. For example, each of the item vectors within a threshold angular distance of a particular taste anchor may be associated with that taste anchor.

Figure 5:
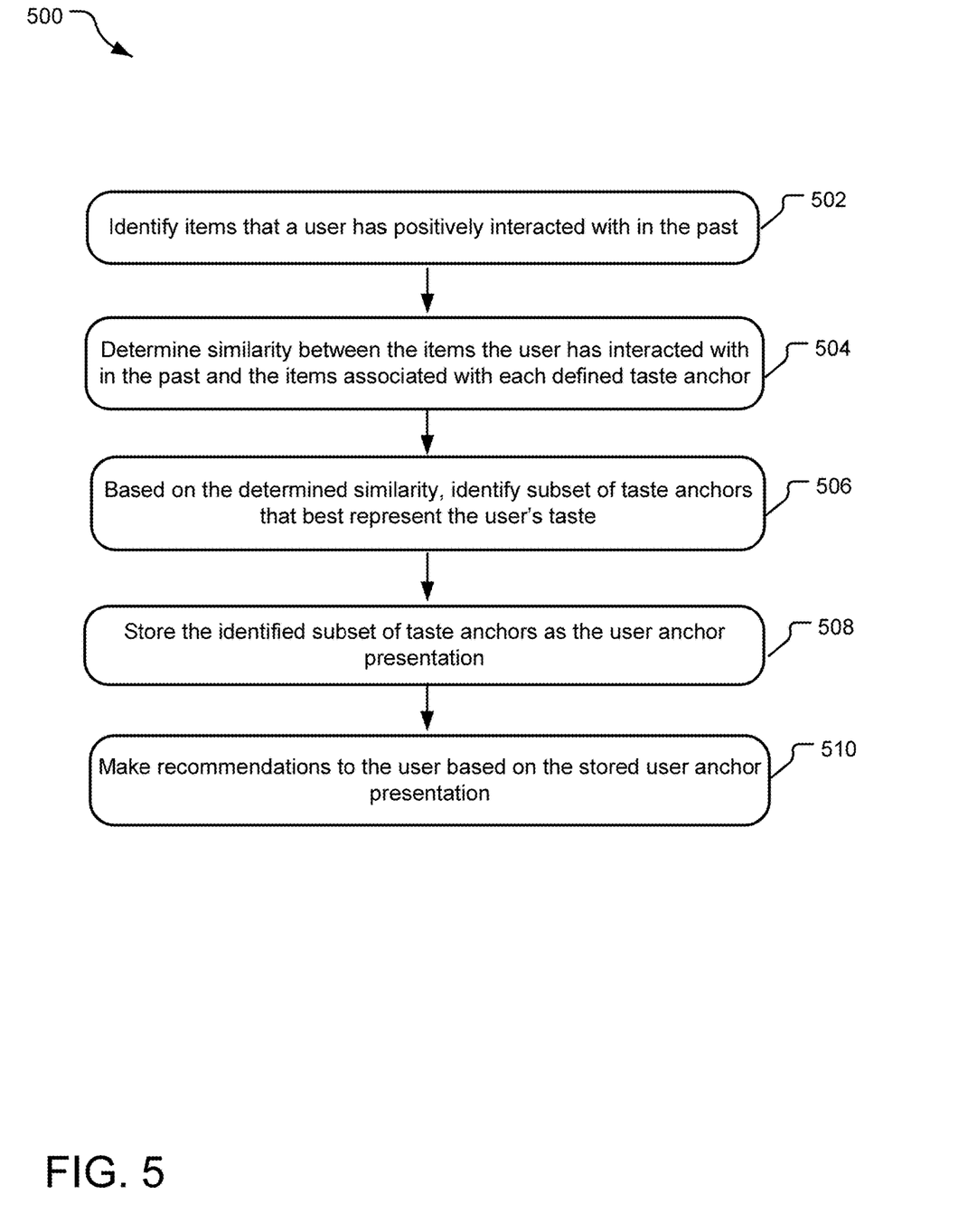
FIG. 5 illustrates example operations for generating an anchor-based representation for a user (a taste palate) based on the taste model derived via the operations of FIG. 4.

FIG. 5 illustrates example operations 500 for generating an anchor-based representation for a user (a taste palate) based on the taste model derived via the operations 400 of FIG. 4. As described above with respect to FIG. 1, the anchor-based representation for the user may be a vector combination of any subset of the taste anchors defined within the taste model.

An identifying operation 502 identifies items that a user has positively interacted with in the past. In one implementation, this identification operation includes defining a user-item interaction history vector for a given user. For example, the user-item interaction history vector may include an index for all moves available on a given platform with 1s identifying the movies the user has positively interacted with and 0s identifying the movies that the user has not positively interacted with.

A comparison operation 404 measures a similarity (e.g., overlap) between the items that the individual user has interacted with in the past (e.g., in the user-item interaction history vector) and the items associated with each taste anchor.

In one implementation, the comparison operation 504 includes initializing an anchor-based presentation vector for the user and optimizing parameters for consistency with the user-item interaction history. For example, the anchor-based presentation vector may be represented as a sum of the complete set of taste anchors (as derived with respect to FIG. 4), each having a weight that is initially unknown and variable with respect to different users. For example, the anchor-based presentation vector may assume the form:

$$W1[\text{Taste1}] + W2[\text{Taste2}] + \ldots Wm[\text{Taste\_}m] \quad (1)$$

where the taste anchors (Taste1, Taste2, etc.) each include an index for all moves available on the given platform with 1s identifying the movies associated with that taste anchor and 0s identifying movies that are not associated with that taste anchor.

In one implementation, the comparison operation 404 is performed by maximizing a scalar product between the anchor-based presentation vector (as in eq. 1, above) and the user-item interaction history vector for the user. For example, this may entail deriving weights (W1, W2, etc.) to assign to each of the different taste anchors. The resulting weights indicate the sub combination of taste anchors that best represents the individual user's taste. If, for example, the user is 80% taste1 (e.g., comedies) and 15% Taste7 (historical science fiction) and 5% Taste11 (French foreign language films) then the user's anchor presentation is given as a combination of Taste1, Taste7, and Taste11.

Based on the similarity determined, an identification operation 506 identifies a subset of the taste anchors associated with items that best align with (have a highest affinity to) the items that the user has positively interacted with in the past. A storing operation 508 stores the identified subset of taste anchors as the user's anchor-based presentation (taste palate). A recommendation operation 510 makes recommendations to the select user based on the stored anchor-based presentation for the user. If, for example, the user anchor-based presentation is a combination of three taste anchors (Taste1, Taste7, and Taste11), the recommendation system picks items associated with these three taste anchors to recommend to the user in the future.

Figure 6:
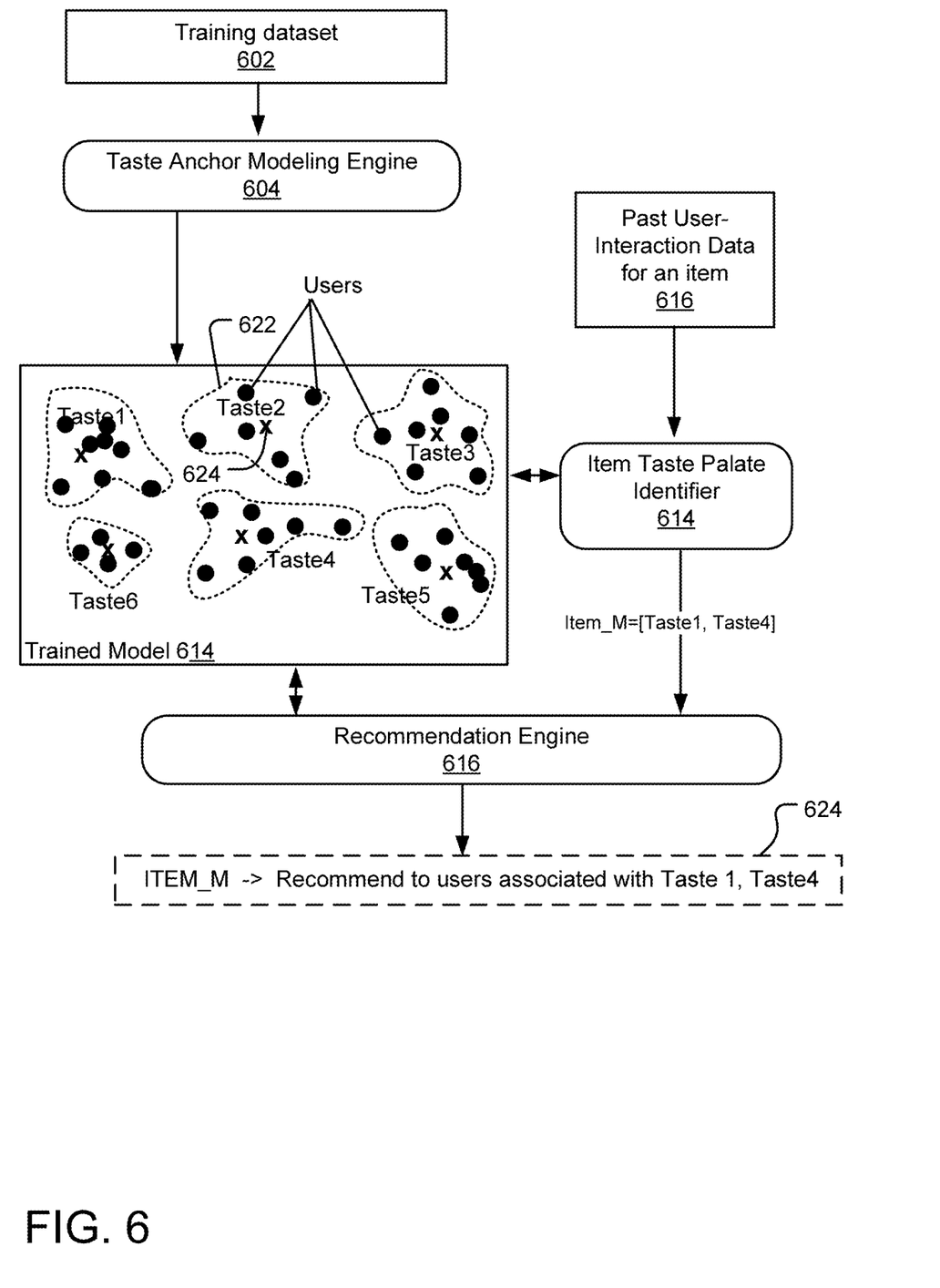
FIG. 6 illustrates another exemplary recommendation system that uses an anchor-based collaborative filtering technique.

FIG. 6 illustrates another exemplary recommendation system 600 that uses an anchor-based collaborative filtering technique. In contrast to the examples provided above in FIG. 1-5, the recommendation system 600 defines taste anchors in association with groups of users rather than items. For example, each defined "taste" (taste anchor) is shared by a group of users, and the recommendation system 600 identifies which tastes are most likely to have an affinity to the item.

The recommendation system 600 includes a taste modeling engine that receives a training dataset 602 that includes user-item interaction pairs that same or similar to those described with respect to the training dataset 102 of FIG. 1. The taste anchor modeling engine 604 determines one or more similarity metrics usable to associate the individual users with different "tastes." For example, the system may a same-item co-occurrence probability for each for each pair of users in the training dataset 106. The "same-item co-occurrence probability" refers to a likelihood of a pair of the users having a positive interaction with a same item. The more similar two users are in their respective tastes (e.g., movie preferences), the higher the same-item co-occurrence probability for those two users.

The taste anchor modeling engine 604 determines a vector representation for each of the users in the training dataset 616 ("user vectors") that is based on the determined similarity metric(s) for each pair of the users. Likewise, the taste anchor modeling engine 606 determines a vector representation for each of a number of taste anchors. In some implementations, the parameters for the taste anchors are optimized concurrent with the parameters for the item vectors. The taste anchors are selected so as to be distributed throughout the defined vector space such that each taste anchor can be defined in association with users in its "neighborhood." For example, the taste model 614 of FIG. 6 illustrates a neighborhood 622 that includes a taste anchor 624 and an associated number of users (black dots within the neighborhood 622).

An item taste palate identifier 614 uses past user-interaction data for an item 616 to identify a collection of users that are likely to positively interact with (e.g., enjoy) the item. For instance, to determine a group of users that may enjoy Item_M, the item taste palate identifier 614 accesses the past user-interaction data for the item 616 to identify a set of users that have previously favorably interacted with Item_M. The item taste palate identifier performs operations to measure overlap between this set of users and the users associated with each of the defined taste anchors. From this comparison, the item taste palate identifier identifies a set of taste anchors (e.g., Taste1, Taste4) that best exemplify a user base that has favorably interacted with the item in the past. This set of taste anchors is referred to below as the anchor-based representation for the item.

A recommendation engine 616 uses the anchor-based presentation derived for a given item to identify a base of users to recommend the item to. In the above example where Item_M has an item anchor presentation of Taste1 and Taste4, the recommendation engine 616 generates a recommendation 624 that provides for recommending Item_M to users that are associated, via the taste model 614, with Taste1 and Taste4.

Features of the recommendation system 600 not specifically discussed with respect to FIG. 6 may be assumed consistent with or similar to features that are discussed elsewhere herein with respect to different figures.

Figure 7:
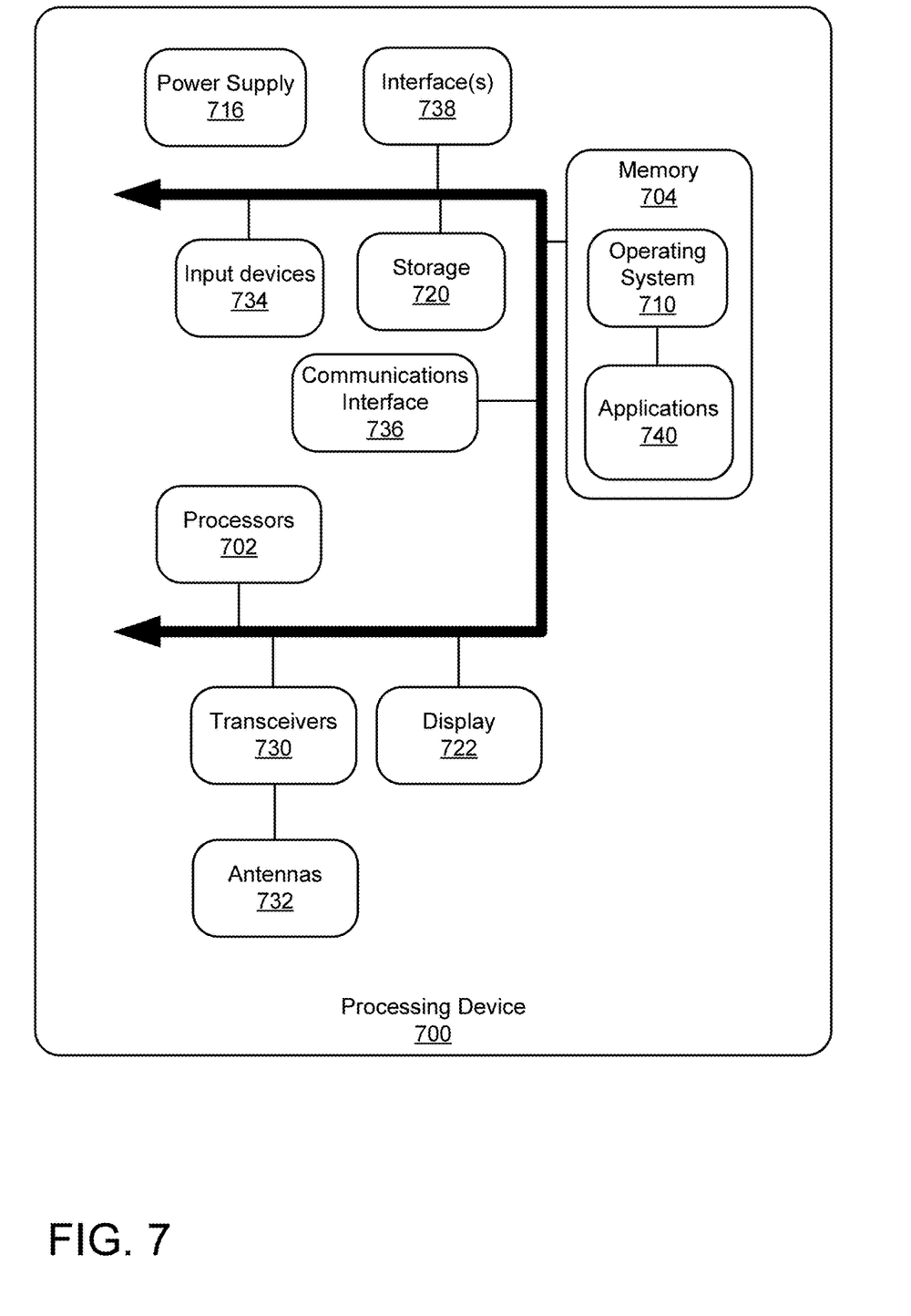
FIG. 7 illustrates an example processing device suitable for implementing aspects of the disclosed technology.

FIG. 7 illustrates an example schematic of a processing device 700 that may be suitable for implementing aspects of the disclosed technology. The processing device 700 includes processors 702 (e.g., a CPU and a USB controller controller), memory 704, a display 722, and other interfaces 738 (e.g., buttons). The memory 704 generally includes both volatile memory (e.g., RAM) and non-volatile memory (e.g., flash memory). An operating system 710, such as the Microsoft Windows® operating system, the Microsoft Windows® Phone operating system or a specific operating system designed for a gaming device, resides in the memory 704 and is executed by the processor(s) 702, although it should be understood that other operating systems may be employed.

One or more applications 740, such as a taste anchor modeling engine (104, 604), user taste palate identifier 114, item taste palate identifier 614, and recommendation engine (116, 616) are loaded in the memory 704 and executed on the operating system 710 by one or more of the processors 702. Applications 740 may receive input from various input local devices (not shown) such as a microphone, keypad, mouse, stylus, touchpad, joystick, etc. Additionally, the applications 740 may receive input from one or more remote devices, such as remotely-located smart devices, by communicating with such devices over a wired or wireless network using more communication transceivers 730 and an antenna 732 to provide network connectivity (e.g., a mobile phone network, Wi-Fi®, Bluetooth®). The processing device 700 further includes storage 720 and a power supply 716, which is powered by one or more batteries and/or other power sources and which provides power to other components of the processing device 700. The power supply 716 may also be connected to an external power source (not shown) that overrides or recharges the built-in batteries or other power sources.

The processing device 700 may include a variety of tangible computer-readable storage media and intangible computer-readable communication signals. Tangible computer-readable storage can be embodied by any available media that can be accessed by the processing device 700 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 900. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

An example system disclosed herein includes a taste anchor modeling engine that receives as input a training dataset including user-item interactions for multiple users. Each one of the user-item interactions identifying a user and an item that the user has positively interacted with. The taste anchor modeling engine defines a vector space, distributes items of the training dataset within the vector space based on a determined similarity of the items to one another, distributes a set of taste anchors within the vector space, and associates each one of the taste anchors in memory with a subgroup of the items in a same neighborhood of the vector space. The system further includes a user taste palate identifier that identifies an anchor-based representation for an individual user based on a measured similarity between past user-item interactions of the individual user and the subgroup of the items associated with each of the taste anchors. The anchor-based representation for the user includes a subset of the taste anchors. The system further includes a recommendation engine that uses the identified anchor-based representation for the individual user to identify and recommend one or more items to the individual user for a future interaction.

In an example system of any preceding system, the user taste palate identifier identifies the anchor-based representation of the individual user by measuring overlap between items the individual user has interacted with in the past and the subgroup of the items associated with each one of the taste anchors.

In another example system of any preceding system, the subgroup of the items associated with each of the taste anchors consists of items that mutually satisfy similarity criteria.

In yet still another example system of any preceding system, the items are represented as a first vector type and the taste anchors are represented as a second vector type and the taste anchor modeling engine is configured to: determine, for each pair of items in the training dataset, a same-user co-occurrence probability indicating a likelihood of a same user interacting with both items in the pair; and distribute the items within the vector space in a manner that provides for closer spatial proximity between items with higher same-user co-occurrence probability than between items with lower same-user co-occurrence probability.

In still another example system of any preceding system, the taste anchor modeling engine defines the set of taste anchors based on the distribution of the items. Each of the taste anchors is associated with the subgroup of the items in a neighborhood surrounding the taste vector.

In yet another example system of any preceding system, the taste anchor modeling engine distributes the taste anchors in the vector space to satisfy an exclusiveness constraint limiting a number of the taste anchors associated with each of the items.

In still another example system of any preceding system, the taste anchor modeling engine distributes the taste anchors to satisfy an inclusiveness constraint ensuring that each taste vector is associated with at least one of the items.

In yet another example system of any preceding system, the anchor-based representation of the individual user is a vector combination that includes a subset of the taste anchors, where the taste anchors are shared across all users of the training dataset.

An example method disclosed herein include providing a training dataset representing user-item interactions for multiple users, where each one of the user-item interactions identifies a user and an item that the user has positively interacted with. The method further provides for defining a vector space, distributing items within the vector space based on a determined similarity of the items to one another, distributing a set of taste anchors within the vector space, and associating each one of the taste anchors in memory with a subgroup of the items in a same neighborhood of the vector space. The method still further provides for identifying, with a processor, an anchor-based representation for an individual user based on a measured similarity between past user-item interactions of the individual user and the subgroup of the items associated with each of the taste anchors. The anchor-based representation includes a subset of the taste anchors. The method further provides for using the identified anchor-based representation to identify and recommend one or more items to the individual user for a future interaction.

In an example method of any preceding method, the subgroup of the items associated with each of the taste anchors consists of items that mutually satisfy similarity criteria.

In still another example method of any preceding method, identifying the anchor-based representation of the individual user further includes measuring overlap between items the individual user has interacted with in the past and the subgroup of the items associated with each one of the taste anchors.

In yet still another example method of any preceding method, the items are represented as a first vector type and the taste anchors are represented as a second vector type, and the method further comprises determining, for each pair of items in the training dataset, a same-user co-occurrence probability indicating a likelihood of a same user interacting with both items in the pair. The items are distributed within the vector space according to an arrangement that ensures closer spatial proximity between items with higher same-user co-occurrence probability than between items with lower same-user co-occurrence probability.

In still another example method of any preceding method, defining the set of taste anchors further comprises distributing the taste anchors within the vector space based on the distribution of the items. Each of the taste anchors is associated with the subgroup of the items that is within a neighborhood surrounding the taste vector in the vector space.

In still another example method of any preceding method, defining the set of taste anchors further comprises distributing the taste anchors based on the distribution of the items and such that the distribution of the taste anchors satisfies an exclusiveness constraint limiting a number of taste anchors associated with each of the items.

In yet another example method of any preceding method, defining the set of taste anchors further comprises distributing the taste anchors within the vector space based on the distribution of the items such that the distribution of the taste anchors satisfies an inclusiveness constraint ensuring that each taste vector is associated with at least one of the items.

In another example method of any preceding method, the method further comprises concurrently optimizing parameters for the items and taste anchors to distribute the items and the taste anchors in the vector space.

An example system disclosed herein includes a taste anchor modeling engine configured to receive as input a training dataset representing user-item interactions for multiple users. Each user-item interaction identifies a user and an item that the user has positively interacted with. The taste anchor modeling engine defines a vector space, distributes users within the vector space based on a determined similarity of the users to one another, distributes a set of taste anchors within the vector space, and associates each one of the taste anchors in memory with a subgroup of the users in a same neighborhood of the vector space. The system further includes a user taste palate identifier and configured to: identify an anchor-based representation for an individual item based on past user-item interactions of the item, where the anchor-based representation of the item includes a subset of the taste anchors. The system still further includes a recommendation engine that use the identified anchor-based representation for the item to identify one or more subgroups of the users to recommend the item to.

In another example system of any preceding system, the taste anchor modeling engine is configured to determine, for each pair of users in the training dataset, a same-item co-occurrence probability indicating a likelihood of the pair of users positively interacting with a same item. The taste anchor modeling engine distributes the users within the vector space in a manner that provides for closer spatial proximity between users with higher same-item co-occurrence probability than between users with lower same-item co-occurrence probability.

In still another example system of any preceding system, the taste anchor modeling engine defines the set of taste anchors based on a spatial distribution of the users such that each of the taste anchors is associated with the subgroup of the users in a neighborhood surrounding the taste vector.

In still another example system of any preceding system, the taste palate identifier identifies the anchor-based representation of the individual item by measuring overlap between users that have positively interacted with the item in the past and the subgroup of the users associated with each one of the taste anchors.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A system comprising:
 a taste anchor modeling engine stored in memory and configured to:
 receive as input a training dataset including user-item interactions for multiple users, each one of the user-item interactions identifying a user and an item that the user has positively interacted with;
 determine, for each pair of items in the training dataset, a same-user co-occurrence probability indicating a likelihood of a same user interacting with both items in the pair;
 define a vector space and distribute items of the training dataset within the vector space in a manner that provides for closer spatial proximity between items with higher same-user co-occurrence probability than between items with lower same-user co-occurrence probability;
 distribute a set of taste anchors within the vector space and associate each one of the taste anchors in memory with a subgroup of the items in a same neighborhood of the vector space, the taste anchors each serving to categorize the associated subgroup of the items in the same neighborhood; and
 a user taste palate identifier stored in memory and configured to:
 measure overlap between items an individual user has previously interacted with and the subgroup of the items associated with each one of the taste anchors;
 based on the measuring, identify a subset of the taste anchors characterized by a greatest degree of the overlap with the items the individual user has previously interacted with;
 store an anchor-based representation of the individual user that includes the identified subset of the taste anchors; and
  a recommendation engine stored in memory and configured to use the anchor-based representation to identify and recommend multiple items to the individual user for a future interaction.

2. The system of claim 1, wherein the user taste palate identifier identifies the anchor-based representation of the individual user by measuring the overlap between items the individual user has positively interacted with in the past and the subgroup of the items associated with each one of the taste anchors.

3. The system of claim 1, wherein the subgroup of the items associated with each of the taste anchors consists of items that mutually satisfy similarity criteria.

4. The system of claim 1, wherein the taste anchor modeling engine defines the set of taste anchors based on the distribution of the items, each of the taste anchors being associated with the subgroup of the items in a neighborhood surrounding the taste vector.

5. The system of claim 1, wherein the taste anchor modeling engine distributes the taste anchors in the vector space to satisfy an exclusiveness constraint limiting a number of the taste anchors associated with each of the items.

6. The system of claim 1, wherein the taste anchor modeling engine distributes the taste anchors to satisfy an inclusiveness constraint ensuring that each taste vector is associated with at least one of the items.

7. The system of claim 1, wherein the anchor-based representation of the individual user is a vector combination that includes a subset of the taste anchors, where the taste anchors are shared across all users of the training dataset.

8. A method comprising:
 providing a training dataset representing user-item interactions for multiple users, each one of the user-item interactions identifying a user and an item that the user has positively interacted with;
 determining, for each pair of items in the training dataset, a same-user co-occurrence probability indicating a likelihood of a same user interacting with both items in the pair;
 defining a vector space and distributing items within the vector space to provide for closer spatial proximity between items with higher same-user co-occurrence probability than between items with lower same-user co-occurrence probability;
 distributing a set of taste anchors within the vector space and associating each one of the taste anchors in memory with a subgroup of the items in a same neighborhood of the vector space, the taste anchors each serving to categorize the associated subgroup of the items in the same neighborhood;
 measuring overlap between items an individual user has previously interacted with and the subgroup of the items associated with each one of the taste anchors;
 based on the measuring, identifying a subset of the taste anchors characterized by a greatest degree of the overlap with the items the individual user has previously interacted with; and
 storing an anchor-based representation of the individual user, the anchor-based representation including the identified subset of the taste anchors; and
 using the anchor-based representation for the user to identify and recommend one or more items to the individual user for a future interaction.

9. The method of claim 8, wherein the subgroup of the items associated with each of the taste anchors consists of items that mutually satisfy similarity criteria.

10. The method of claim 8, wherein identifying the anchor-based representation of the individual user further includes measuring the overlap between items the individual user has positively interacted with in the past and the subgroup of the items associated with each one of the taste anchors.

11. The method of claim 8, wherein defining the set of taste anchors further comprises distributing the taste anchors within the vector space based on the distribution of the items, each of the taste anchors being associated with the subgroup of the items that is within a neighborhood surrounding the taste vector in the vector space.

12. The method of claim 8, wherein defining the set of taste anchors further comprises distributing the taste anchors based on the distribution of the items, the distribution of the taste anchors satisfying an exclusiveness constraint limiting a number of taste anchors associated with each of the items.

13. The method of claim 8, wherein defining the set of taste anchors further comprises distributing the taste anchors within the vector space based on the distribution of the items, the distribution of the taste anchors satisfying an inclusiveness constraint ensuring that each taste vector is associated with at least one of the items.

14. The method of claim 8, further comprises: concurrently optimizing parameters for the items and taste anchors to distribute the items and the taste anchors in the vector space.

15. A system comprising:

a taste anchor modeling engine stored in memory and configured to:

receive as input a training dataset representing user-item interactions for multiple users, each user-item interaction identifying a user and an item that the user has positively interacted with;

determine, for each pair of users in the training dataset, a same-item co-occurrence probability indicating a likelihood of the pair of users positively interacting with a same item;

define a vector space and distribute users within the vector space in a manner that provides for closer spatial proximity between users with higher same-item co-occurrence probability than between users with lower same-item co-occurrence probability;

distribute a set of taste anchors within the vector space, each one of the taste anchors being associated in memory with a subgroup of the users in a same neighborhood of the vector space, the taste anchors each serving to categorize the associated subgroup of the items in the same neighborhood; and a user taste palate identifier stored in memory and configured to:

measure overlap between users that have previously interacted with an individual item and the subgroup of the users associated with each one of the taste anchors;

based on the measuring, select a subset of the taste anchors;

store an anchor-based representation of the individual item, the anchor-based representation including the identified subset of the taste anchors; and a recommendation engine stored in memory and configured to use the anchor-based representation for the item to identify one or more subgroups of the users to recommend the item to.

16. The system of claim 15, wherein the taste anchor modeling engine defines the set of taste anchors based on a spatial distribution of the users, each of the taste anchors being associated with the subgroup of the users in a neighborhood surrounding the taste vector.

17. The system of claim 15, wherein measuring the overlap includes measuring overlap between users that have positively interacted with the item previously and the subgroup of the users associated with each one of the taste anchors.

* * * * *